(12) United States Patent
Okamoto

(10) Patent No.: US 6,887,407 B2
(45) Date of Patent: May 3, 2005

(54) METHOD FOR PRODUCING A LAMINATED ARTICLE

(75) Inventor: Akio Okamoto, Onoda (JP)

(73) Assignee: Ube Machinery Corporation, Ltd., Ube (JP)

( * ) Notice: Subject to any disclaimer, the term of this patent is extended or adjusted under 35 U.S.C. 154(b) by 0 days.

(21) Appl. No.: 10/297,945

(22) PCT Filed: May 30, 2001

(86) PCT No.: PCT/JP01/04529

§ 371 (c)(1),
(2), (4) Date: Dec. 26, 2002

(87) PCT Pub. No.: WO02/00413

PCT Pub. Date: Jan. 3, 2002

(65) Prior Publication Data

US 2003/0098525 A1 May 29, 2003

(30) Foreign Application Priority Data

Jun. 29, 2000 (JP) .................................... 2000-196934

(51) Int. Cl.⁷ .................... B29C 45/14; B29C 45/56; B29C 45/80

(52) U.S. Cl. .............. 264/40.5; 264/266; 264/328.7; 264/328.9

(58) Field of Search ............... 264/40.1, 40.5, 264/40.6, 255, 257, 259, 266, 328.7, 328.9, 328.11, 328.1; 425/112, 125, 149, 150, 156

(56) References Cited

U.S. PATENT DOCUMENTS

| | | | |
|---|---|---|---|
| 5,154,872 A | | 10/1992 | Masui et al. ............ 264/266 |
| 5,543,094 A | * | 8/1996 | Hara et al. ............ 264/46.4 |
| 5,772,932 A | * | 6/1998 | Kamiguchi et al. ...... 264/40.5 |
| 5,785,910 A | * | 7/1998 | Sakashita et al. ....... 264/45.5 |
| 5,830,402 A | * | 11/1998 | Harada et al. .......... 264/266 |
| 5,968,437 A | * | 10/1999 | Harada .................. 264/266 |
| 6,045,732 A | * | 4/2000 | Nakatsuji et al. ....... 264/46.4 |
| 6,203,744 B1 | * | 3/2001 | Hara et al. ............ 264/266 |
| 6,517,755 B1 | * | 2/2003 | Okamoto et al. ........ 264/40.5 |

FOREIGN PATENT DOCUMENTS

| | | |
|---|---|---|
| DE | 195 31 143 A1 | 2/1997 |
| DE | 198 43 921 A1 | 3/2000 |
| EP | 0 997 256 A1 | 5/2000 |
| JP | 59-150740 | 8/1984 |
| JP | 11-90970 | 4/1999 |
| JP | 11-226990 | 8/1999 |
| JP | 11-226993 | 8/1999 |

OTHER PUBLICATIONS

Derwent Publication Ltd., No. AN–1999–521806 and XP002183969, dated Nov. 30, 1999. See PCT search report.

* cited by examiner

Primary Examiner—Angela Ortiz
(74) Attorney, Agent, or Firm—Armstrong, Kratz, Quintos, Hanson & Brooks, LLP

(57) ABSTRACT

A method for producing a multilayer molded article having good feeling of touch without giving damages on a skin material at the vicinity of gate portions by fushion-bonding integrally a skin material to a core material using a horizontal mold clamping type injection molding machine which comprises steps of closing a movable mold so that a mold interval between the movable mold and a fixed mold is set to a predetermined distance after the skin material is set up in the cavity of a mold, starting injection and filling-up of a resin melt for a core material into the cavity of mold, retracting the movable mold with progress of injection and filling-up until the mold interval becomes a predetermined distance after lapse of a predetermined time from the start of injection, and clamping the mold again after the completion of the injecting.

3 Claims, 3 Drawing Sheets

METHOD FOR PRODUCING A LAMINATED ARTICLE

TECHNICAL FIELD

The present invention relates to a method for producing a laminated article, to which a skin material having a resin decorative layer is laminated, by integrally fusion bonding the skin material to a resin melt for a core material by press molding using a horizontal mold clamping type injection molding machine.

BACKGROUND ART

Recently, resin molded articles used in automobiles, home electric appliances, construction materials and so forth are often manufactured by a lamination (multilayer molding method) by fusion bonding integrally a skin material having a resin decorative layer to a core material composed of a thermoplastic resin in order to improve the quality of a molded article and add a value thereto by providing an article with decorativeness, good feeling of touch and the like, and to reduce a cost by omitting some steps in the molding processes.

The technology described in JP-A-59-150740 for "Method for Manufacturing Multilayer Molded Article" discloses a typical molding method for laminating a skin material to a core material. That is, disclosed in the conventional art is such that after the peripheral portions of a skin material are held between a skin material fixing frame, which is movably attached to a female mold and has an opening through which a male mold slidingly passes, and the male mold, a resin melt is supplied to the space between the skin material and the male mold, and the skin material is laminated integrally to a core material fromed from the resin melt by clamping the male mold and the female mold.

Further, there are proposed various methods for manufacturing a multilayer molded article laminated with a skin material having a good feeling of touch and free from any damage. Among these conventional arts, there is given illustratedly a method disclosed in U.S. Pat. No. 5,154,872 under the title of "Process for Producing Multilayer Molded Article" in which much attention has been paid to the conditions for supplying a resin melt for a core material. According to the method disclosed therein, the clampling of a male mold and a female mold is started, and then a resin melt for a core material is supplied to the space formed between a skin material and the male mold with keeping the cavity clearance between the male mold and the female mold in the range of 5–100 mm, during a state that the mold clamping action is temporarily stopped in the midway of the mold clamping action or that a mold clamping rate is set to 30 mm/sec or less. This method is a method of fusion bonding the skin material and a core material using a vertical mold clamping type press molding machine.

When this conventional art is applied as it is to a horizontal mold clamping type injection molding machine (or press molding machine), there remain following problems unsolved. That is, when a resin melt is injected into the cavity of the mold and the cavity is filled with the resin melt in a state that the mold is opened larger than a specific distance, for example, at least 50 mm, the resin melt injected into the cavity hangs down by the influence of gravity. As a result, a multilayer molded article having good feeling of touch cannot be effectively manufactured due to the fluctuation in the wall thickness of the molded article caused by the resin melt filled unevenly, the occurrence of burrs caused by the invasion of the resin melt into the parting face and the landed part of the mold, and the like.

Further, if one tries to form a laminated molded article by using a horizontal mold clamping type injection molding machine without using the a material fixing frame or the like, the skin material does not get into the cavity of the mold even if the resin melt is filled into the cavity under the above-mentioned state. Even if the mold is closed in this state, the skin material is partly in excess in the mold since the skin material is not changed into a shape corresponding to a molded article. Thus, even if the mold is filled with a resin melt for a core material, the excessive portion of the skin material is heated and drawn, and resultantly wrinkles are formed on the skin material, thereby the appearance of the surface of the skin material is greatly deteriorated.

Further, when the injection and filling-up of a resin melt is carried out by placing the mold in a state in which no hanging-down of the resin melt is caused, that is, in a state that the mold is opened, for example, at a distance of about 5 mm not so as to cuase the hanging-down of the resin melt injected, a problem arises in that the skin material is melted and damaged in the vicinity of gate portions due to high temperature of the injected resin melt.

As described above, when the lamination is carried out using the horizontal mold clamping type injection molding machine, it is necessary to solve the hanging-down problem of an injected resin melt as well as to prevent the damage of a skin material in the vicinity of gate portions. However, these problems cannot be solved by the conventional molding method.

DISCLOSURE OF INVENTION

An object of the present invention is to provide a method for producing a laminated article which is capable of effectively manufacturing a multilayer molded article having good feeling of touch when fusion bonding is carried out using a horizontal mold clamping type injection molding machine.

According to the present invention, first, there is provided a method for producing a laminated article by fusion bonding integrally a skin material to a core material formed from a resin melt by using a horizontal mold clamping type injection molding machine; the method including the steps of closing a movable mold so that the mold interval between both the movable mold and a fixed mold becomes a predetermined value after the skin material is set up to the movable mold; starting the injection so as to fill a cavity of the mold with a resin melt; moving the movable mold in accordance with the progress of the injection and filling-up until the mold interval becomes a predetermined value after a predetermined time has passed from the start of the injection; and clamping the mold after the completion of the injecting operation.

Secondly, there is provided a method which further comprises clamping the mold by moving the movable mold to a mold clamping position so that the mold interval between the mold is in the range of 2–25 mm after the skin material is set up to the movable mold.

Thirdly, there is provided a method which further comprises retracting at a desired timing the movable mold after the completion of the injection so as to form an interval wherein an air insulation layer is formed between the skin material and the movable mold, and keeping this state for a period of predetermined time until a temperature of the skin material becomes equal to or higher than a glass transition temperature of the skin material due to a sensible heat of the resin melt for the core material.

As described above, in the horizontal clamping type injection molding machine, when the mold is opened excessively, the injected resin melt hangs down by its own weight. In particular, the hanging-down becomes predominant when the viscosity of the resin melt is reduced. Further, when the resin hangs down in the cavity of the mold, the hung-down resin invades even into the parting face and the landed part of the mold and the mold may not be closed. Further, even if the mold can be closed, a problem arises in that the wall thickness of a product is fluctuated due to the uneven filling-up of the resin melt for core material and that the feeling of touch of the skin material is deteriorated due to the locally excessive filling-up of the resin melt.

In contrast, when the distance of between the movable mold and the fixed mold is kept small at the start of injection, the injected resin melt can reach the skin material disposed on the movable mold side which is a counter side to the injection side before it hangs down. With this arrangement, the resin melt injected into the cavity of the mold forms a bridge like connection between the fixed mold and the skin material, thereby the hanging-down of the resin melt can be prevented by the effect of the resultantly formed bridge like connection. When the resin melt reaches the skin material just after the start of the injection and filling-up and resultantly a so-called bridge effect due to the bridge like connection formed integrally between the skin material and the resin injected is established, the movable mold is opened gradually in accordance with the progress of the injection and the filling-up so that an excessive surface pressure is not applied to the skin material by an injection pressure. In this manner, the occurrence of burrs can be prevented as well as the melting of the skin material in the vicinity of the gate portions, which is caused by an excessive resin pressure, can be prevented.

It should be noted that the above-mentioned bridge effect means an effect that can prevent hanging-down of the injected resin melt due to the clamping force given to a resin melt injected into the cavity of the mold from both sides between both movable mold and fixed mold. FIGS. 3(A) and 3(B) are shown to make the understanding of it easier. That is, in the state shown in FIG. 3(A), the interval between the movable mold and the fixed mold is appropriately maintained so that an injected resin melt is held in a bread dough like form and no hanging-down of the resin is caused. In contrast, the interval between the movable mold and the fixed mold is excessively increased in the state shown in FIG. 3(B) with a result that the injected resin melt hangs down and reaches the mating portion of the movable mold and the fixed mold. In this state, desired molding cannot be carried out because a mold clamping operation cannot be performed.

BRIEF DESCRIPTION OF THE DRAWINGS

FIGS. 3A and 3B are views explaining a bridge effect, wherein FIG. 3A shows a case in which the bridge effect can be obtained, and FIG. 3B shows a case in which the bridging effect cannot be obtained.

BEST MODE FOR CARRYING OUT THE INVENTION

Figure 1:
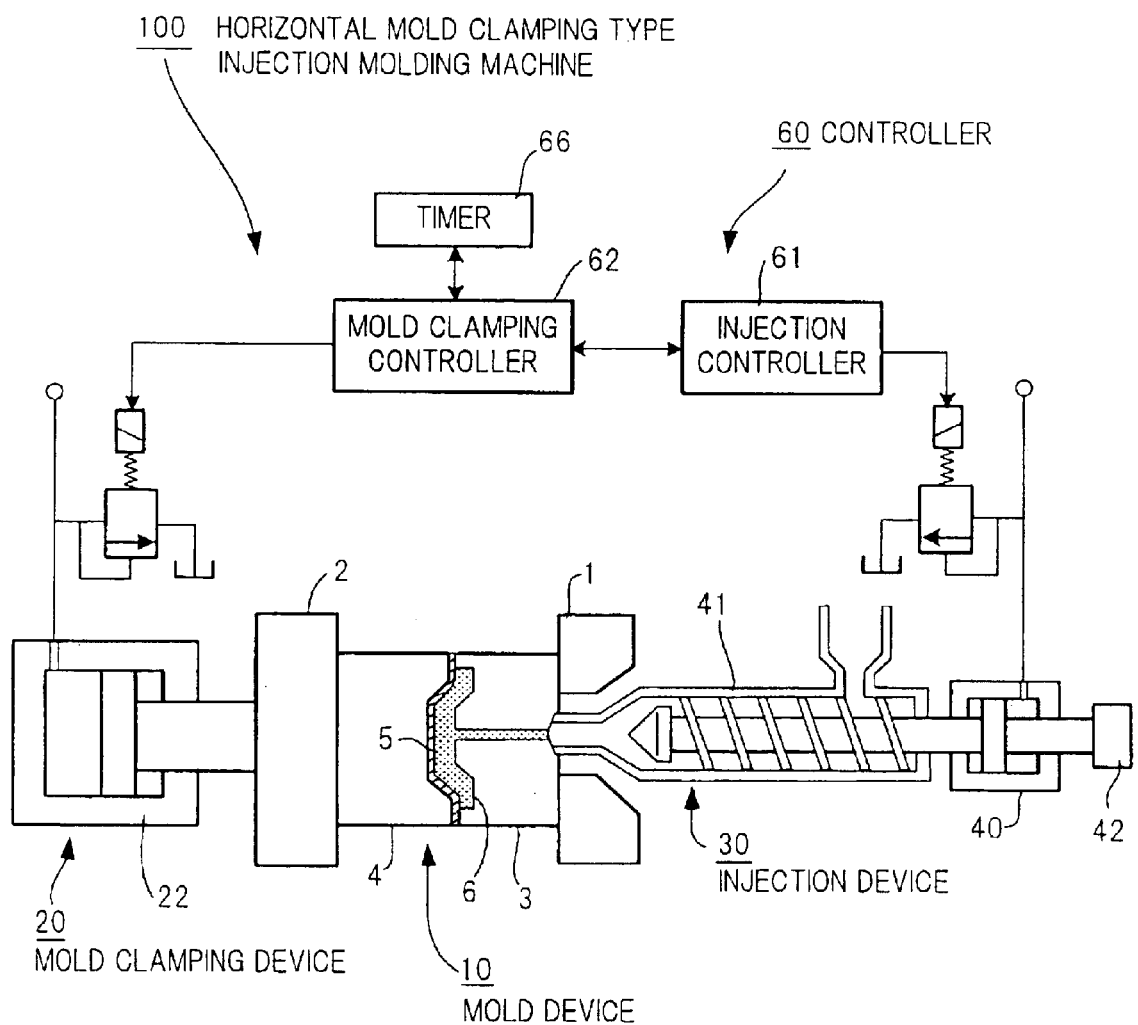
FIG. 1 is a view explaining a horizontal mold clamping type injection molding machine used in a bonding and molding method according to the present invention.
Figure 2:
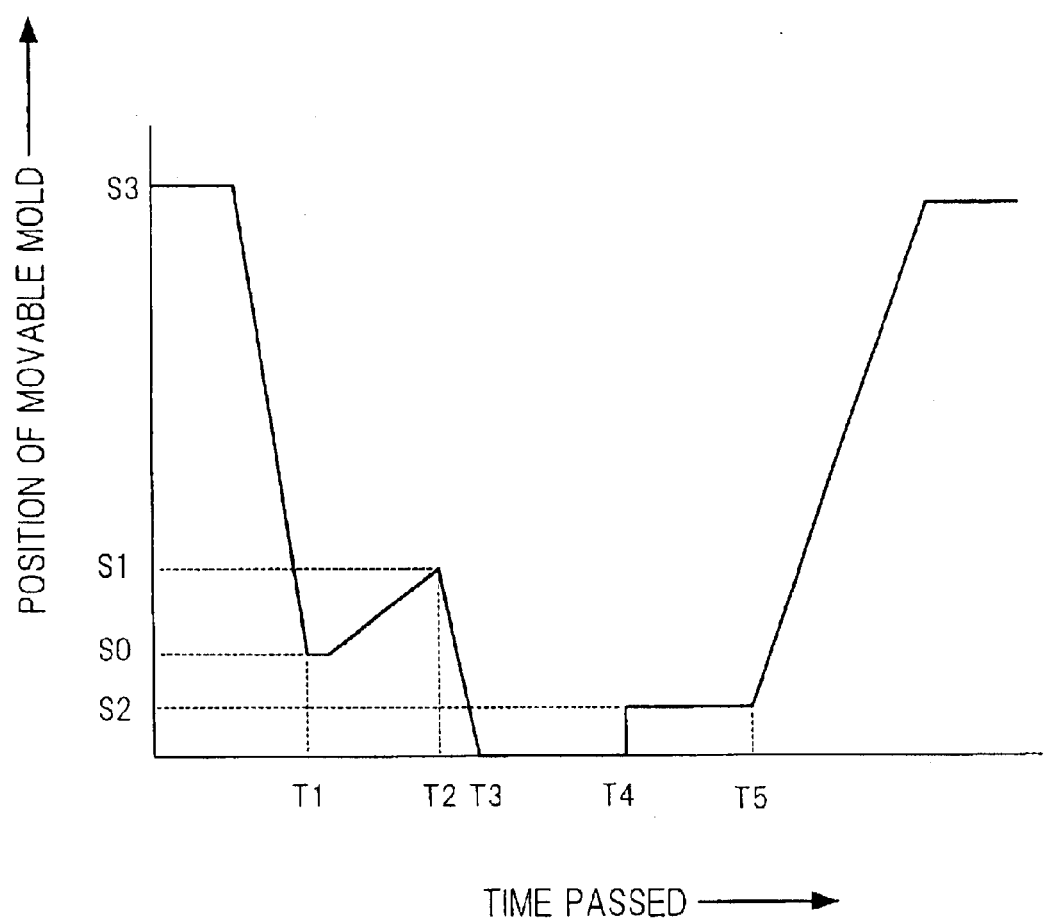
FIG. 2 is a timing chart showing the operation progress of a movable mold according to the present invention.
Figure 3A:
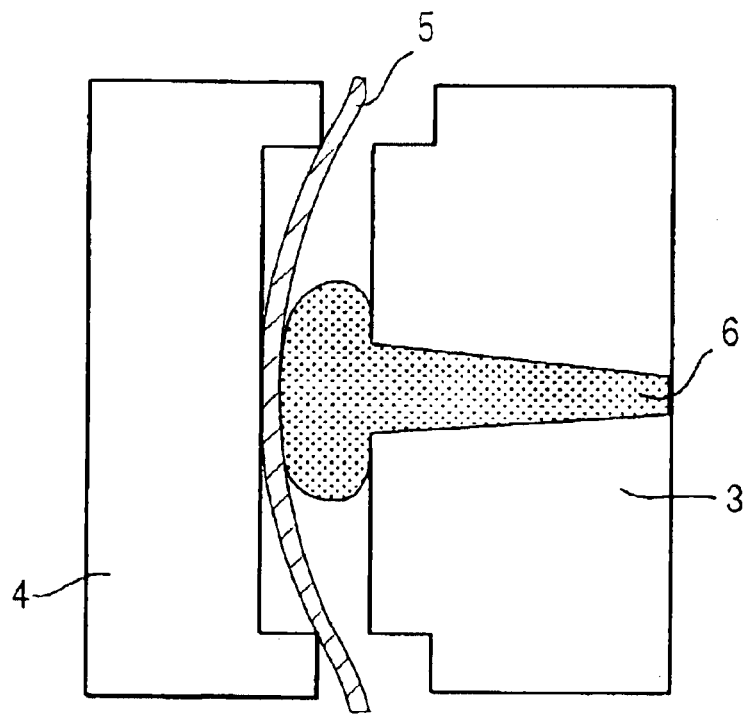
Figure 3B:
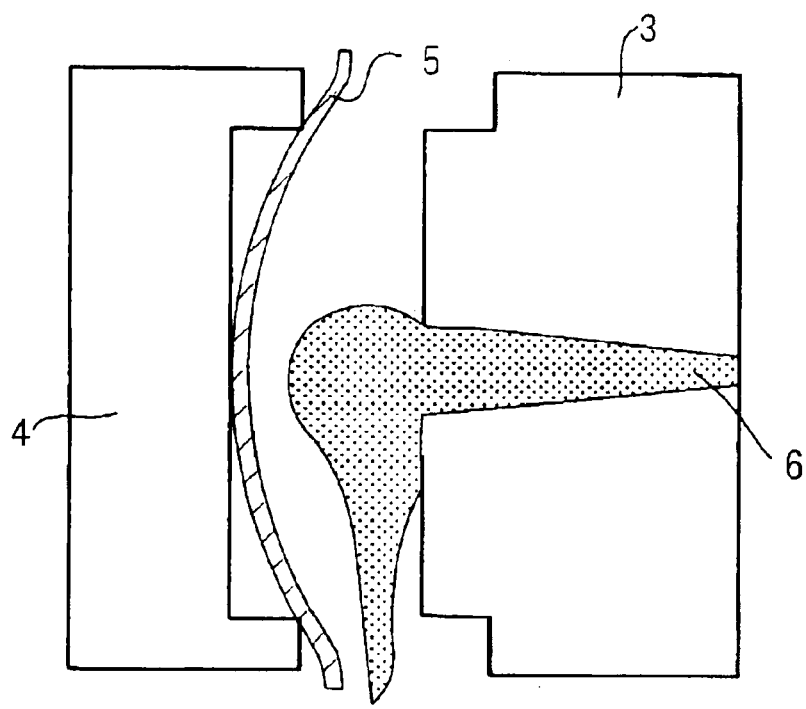

An embodiment of the present invention will be described below with reference to the drawings. FIGS. 1 and 2 relate to the embodiment of the present invention, wherein FIG. 1 is a view showing an overall construction of a horizontal mold clamping type injection molding machine usable in the present invention, and FIG. 2 is a timing chart showing an example of the operation progress of a movable mold according to the present invention. Further, FIG. 3 is a view explaining a bridge effect.

The present invention is not limited to the embodiment described below and can be embodied in various modes within the range which does not depart from the gist of the present invention.

Further, since the arrangement of the injection molding machine and the conditions emplyed for the molding method of the present invention except those described below are quite general ones. Therefore, the detailed description on the general ones will be omitted.

First, the construction of the horizontal mold clamping type injection molding machine that is ordinarily used in the present invention will be described. As shown in FIG. 1, the horizontal mold clamping type injection molding machine 100 used in the present invention is composed of an injection device 30, a mold clamping device 20, a mold device 10 and a controller 60.

The mold device 10 is composed of a fixed mold 3 mounted on a fixed plate 1 and a movable mold 4 mounted on a movable plate 2, and the movable plate 2 and the movable mold 4 can be moved forward and backward by the mold clamping cylinder 22 of the mold clamping device.

The mold clamping device 20 includes the mold clamping cylinder 22 for opening and closing the mold of the mold device, and the movable mold is moved forward and backward with respect to the fixed mold by being guided by tie bars (not shown).

The injection device 30 is composed of an injection unit 40, an injection cylinder 41, and a hydraulic motor 42.

In contrast, as shown in FIG. 1, the controller 60 is composed of an injection controller 61 for controlling the plasticization of a molding material resin and the injection of a resin melt into the cavity of the mold, a mold clamping controller 62 for controlling the opening and closing of the mold and a mold clamping force, a timer 66 and so forth.

It should be noted that, while the injection molding machine having the direct pressure type mold clamping device shown in FIG. 1 is used in the embodiment to be described below, an injection molding machine having a toggle type mold clamping device and an injection molding machine having an electric mold clamping may be used.

Next, a method for producing a laminated article according to the present invention by fusion bonding a skin material to a core material by press molding so as to laminate them integrally with each other will be described. The molding method of the present invention may be carried out by using a molding machine shown in, for example, FIG. 1 and ordinarily includes the following steps:

(a) step of setting up a skin material by inserting it at a predetermined position in a cavity of a mold while keeping the mold open;

(b) step of closing the mold to a predetermined mold clamping position;

(c) step of injecting a resin melt for a core material into a space formed by the mold and the skin material so as to fill the space with the resin melt;

(d) step of opening the mold up to a desired mold clamping position after a desired period of time passes from the start of injection of the resin melt while continuing to inject the resin melt into the space;

(e) step of closing the mold after the resin melt is injected and the space is filled with the resin melt so as to apply a desired mold clamping force to an intermediate molded article haused in a cavity and composed of the skin material and the core resin material;

(f) step of opening the mold at a predetemined distance so as to form a sufficient space between the skin material and the cavity face of the mold at a desired preset timing, and maintaining this state for a desired period of time; and (g) step of opening the mold so as to take out a molded article from the mold.

Next, the respective steps will be explained with reference to FIG. 2. At step (a), the movable mold 4 is located at a position S3 where the movable mold is ordinarily opened to secure a volume necessary to carry out a preparatory work before the injecting and filing-out of a resin melt. A skin material 5 is set in the movable mold in this state. While the skin material may be held by a skin material fixing frame (not shown) disposed in the movable mold, the skin material may be held between the fixed mold and the movable mold by holding them so as to make them disposed in a desired positional relationship without particularly using any skin material fixing frame.

After the skin material is set up in the movable mold, the process goes to step (b) at which the movable mold 4 is clamped up to a mold clamping position S0. It is preferable that the clamping position S0 be set such that the interval S between the movable mold and the fixed mold is in the range of 2–25 mm. When the mold interval S is less than 2 mm, the skin material may be strongly restrained by the fixed mold and the movable mold. Thus, when the resin melt is injected, the skin material may be prevented from freely moving along the mold. As a result, it may be difficult to produce a molded article having a good apperance and good shape because the skin material is wrinkled or partially stretched. It should be noted that the mold interval used here means the distance between the movable mold and the fixed mold when the movable mold is moved in a mold opening direction from a state of the mold interval 0 at which both movable mold and fixed mold are clamped up to the size of a final product.

In contrast, when the mold interval S exceeds 25 mm, not only it is difficult for the fixed mold and the movable mold to clamp the skin material but also a so-called bridge effect, which is an action for holding the injected resin melt in the cavity of the mold, is weakened and a phenomenon that the resin melt hangs down is liable to occur. Note that the bridge effect is an effect for preventing the hanging-down of the injected resin melt by the protruding action of the resin melt which is caused in such a manner that the resin melt injected from the fixed mold side as described above reaches the skin material and presses the skin material against the movable mold side by an injection pressure.

Next, the process goes to step (c) at which the resin melt is injected in a predetermined amount into the cavity space formed by the fixed mold and the skin material by the injection device 30. The timing of the injection is controlled in response to the time-out signal of a timer which is started when the movable mold reaches the mold clamping position S0.

At step (d), the movable mold is opened so as to make it retracted to a mold clamping position S1 when the injected resin melt reaches the skin material and is held in the mold by the bridge effect. The timing at which the movable mold is opened is controlled in response to the time-out signal from a timer which is started when the movable mold reaches the mold clamping position S0. While the timing at which the movable mold is opened is different depending upon a shape of a product to be molded and molding conditions, it is sufficient to set the timing based on a result of trial molding which is made to determine various molding conditions prior to the start of molding of final products on an industrial scale.

Further, while the mold clamping position S1, in other words, the amount of opening of the mold in injection also is different depending upon the shape of the product and the molding conditions, it is sufficient to set the mold clamping position S1 based on the result of the above-mentioned trial molding. In general, the moving amount of the movable mold is preferably 5–50 mm. The moving amount less than 5 mm is not preferable because a resin pressure is increased at gate portions when the mold is opened and a gate mark remains on the skin material of a final product when the final product is taken out. Whereas, when the moving amount is larger than 50 mm, a molding cycle time would become longer due to an increase in a time rerquired to open the mold and the bridge effect is weakened as well, and thus the resin melt is liable to hang down.

At step (e), the molding of the final product is completed by clamping the mold while applying a desired mold clamping force to the skin material housed in the cavity and to the injected resin melt until the movable mold is moved from the mold clamping position S1 to the position corresponding to the size of the final product, that is, until the mold interval becomes 0.

Next, the process goes to step (f). At the step, a slight amount of a gap is formed between the skin material and the movable mold by retracting the movable mold to a mold clamping position S2 in a desired amount at a predetermined timing. Air is taken into the gap by opening the mold so as to form a so-called air insulation layer therebetween. The formation of the air insulation layer elevates temperature of the skin material again by the amount of heat of the resin melt for the core material and an elevated temperature becomes equal to or higher than a glass transition temperature of the resin forming the skin material. The above-mentioned predetermined timing means a timing at which the core material still has an amount of heat sufficient to reheat the skin material to a temperature equal to or higher than a glass transition temperature of the resin that forms the skin material. It is sufficient to determine this timing based on the result of trial molding carried out to determine the various molding conditions.

Since the temperature of the skin material is elevated to a desired temperature again and the skin material is held for a desired period of time at step (f), the damage of the skin material caused at step (e) can be restored by itself by the elasticity of the resin as the material of the skin material.

Finally, at step (g), the mold is opened up to S3 at which a molded article is taken out, whereby one molding cycle is completed.

Next, the excellent effects of the present invention will be explained by the comparison of examples of the present invention with comparative examples.

EXAMPLE 1

A standard molded example will be explained as an example 1. A horizontal toggle mold clamping type injection molding machine (DP350 injection molding machine 1100 made by Ube Kosan Kikai Co.) was used as an injection molding machine, a polypropylene resin (madder by Grand Polymer Co.) was used as a core material resin 6, and a laminated sheet (thickness; 2.5 mm) on which a polypropylene foamed sheet (thickness; 2 mm, extent of foaming; 15 times, surface TPO sheet (thickness; 0.5 mm) laminated on the surface of the foamed sheet) was used as a skin material 5. A sheet-shaped article of 300×200 mm was used as a molded article. Further, a resin temperature was set to 200° C. and a mold temperature was set to 30° C. as molding conditions.

Next, a molding method will be explained:

(a) the skin material was set up in the cavity of the mold in a mold open state in which a movable mold was retracted up to the position S3;

(b) a molding cycle was started by actuating a mold clamping controller 62 so that the movable mold was closed from the mold open position S3 to the mold clamping position S0 (5 mm in the example);

(c) an injection controller 61 was actuated in response to the time-out signal from a timer 66 which was started from the time at which the movable mold reached S0 so as to start the injection of the core material resin melt into the cavity of the mold;

(d) the movable mold was retracted up to the mold clamping position S1 (20 mm in the example) in response to the time-out signal of another timer (not shown) which was started from the time at which step (c) started;

(e) after the injection and filling-up was completed, the movable mold was moved forward to the position corresponding to the size of a final product, that is, to the position where a mold interval became 0 and the mold was closed with the mold clamping force of 20 tonf applied thereto.

(f) the molded article was taken out by opening the mold after a cooling time (30 seconds in the example) passed.

Evaluation of the molded article: no melting of the skin material of the molded article was observed in the vicinity of a gate portion and no leakage of the core material resin from the mold cavity was observed. Accordingly, the thus obtained molded article had excellent quality.

EXAMPLE 2

A molded example to which a skin material restoring step is added will be explained as a second example.

An injection molding machine, molding materials, a molded article, molding conditions and the like were the same as those of the example 1.

Next, a molding method will be explained.

(a) a skin material was set up in the cavity of the mold in a mold open state in which the movable mold was retracted up to the position S3;

(b) a molding cycle was started so that the movable mold was closed from the mold open position S3 to the mold clamping position S0 (5 mm in the example);

(c) the injection of a resin melt for a core material into the cavity was started in response to the time-out signal from the timer which was started from the time at which the movable mold reached the mold open position S0;

(d) the movable mold was moved to the position S1 (20 mm in the example) in response to the time-out signal from another timer (not shown) which was started from the time at which step (c) was started so as to open the mold;

(e) after the injection and filling-up was completed, the movable mold was moved to the position corresponding to the size of a final product, that is, until the mold interval became 0 and the mold was closed with the mold clamping force of 20 tonf applied thereto;

(f) further, when 10 seconds passed from the start of the mold clamping at step (e), the movable mold was moved to the position S2 (3 mm in the example) and the mold was opened.

(g) a molded article was taken out by opening the mold after a cooling time (30 seconds in the example) was held in the state of step (f).

Evaluation of the molded article: no melting of the skin material of the molded article was observed in the vicinity of a gate portion and no leakage of the injected resin melt from the mold cavity was observed. Accordingly, the thus obtained molded article had excellent quality. Further, the thickness of the skin material could be restored to 70% of the thickness thereof before it was molded.

COMPARATIVE EXAMPLE 1

Next, a molded example of a case in which a mold having a large initial opening interval is used will be explained as a comparative example 1.

An injection molding machine, molding materials, a molded article, molding conditions and the like used were the same as those of the example 1 except those mentioned below.

Next, a molding method will be explained.

(a) a skin material was set up in the cavity of the mold in the mold open state by retracting the movable mold up to the position S3;

(b) the movable mold was moved by starting the molding cycle and closed from the mold open position S3 to the mold clamping position S0 (50 mm in this comparative example);

(c) the injection of a resin melt into the cavity was started in response to the time-out signal of the timer which was started from the time at which the movable mold reached the mold open position S0;

(d) the movable mold was moved to the position corresponding to the size of a final product, that is, to the position where the mold interval became 0 while performing injection and filling-up and the mold was closed with the mold clamping force of 20 tonf applied thereto.

(e) the mold was opened and a molded article was taken out after a cooling time (30 seconds in the example) passed.

Evaluation of the molded article: the resin melt having been injected was leaked to the outside of the mold cavity and the cavity could not be fully filled with the resin melt. Further, the thickness of the skin material was 50% or less of the thickness thereof before it was molded, and damages were conspicuously formed on the skin material.

COMPARATIVE EXAMPLE 2

Next, a molded example of a case in which mold having a small initial opening interval is used will be dexplained as a comparative example 2.

An injection molding machine, molding materials, a molded article, molding conditions and the like were the same as those of the example 1 except those mentioned below.

Next, a molding method will be explained.

(a) a skin material was set up the cavity of the mold in the mold open state by retracting the movable mold up to the position S3;

(b) the movable mold was moved by starting the molding cycle and closed from the mold open position S3 to the position S0 (10 mm in the comparative example);

(c) the injection of a resin melt into the cavity was started in response to the time-out signal from the timer which was started from the time at which the movable mold reached the mold open position S0;

(d) the movable mold was moved to the position corresponding to the size of a final product, that is, until the mold interval became 0 while performing injection and filling-up and the mold was closed with the mold clamping force of 20 tonf applied thereto;

(e) the mold was opened and a molded article was taken out after the cooling time (30 seconds) passed.

Evaluation of the molded article: while the cavity could be filled with the resin melt, the skin material was partially damaged in the vicinity of a gate portion and the outside appearance of the molded article was bad. Further, the thickness of the skin material was 40% or less of the thickness thereof before it was molded, and damages were conspicuously formed on the skin material.

INDUSTRIAL APPLICABILITY

As described above, the molding method according to the present invention is excellent in industrial applicability. That is, the following effects can be achieved:

first, a horizontal clamping type injection molding machine the hanging-down of a resin can be minimized due to the bridge effect between a skin material and the fixed mold by keeping a gap between the mavable mold and the fixed mold smaller at the start of injection, and thus the unevenly filled state of a resin melt can be greatly removed as well as the resin melt does not invade into the parting face and the landed part of the mold;

second, since the mold interval is widened as injection proceeds, a core material is fusion-bonded integrally to the skin material without giving an excessive heat and a resin pressure locally at the vicinity of the gate portions. In particular, this process is more effective to a skin material provided with a foamed layer which is weak to heat;

third, the occurrence of wrinkles on the skin material can be prevented by increasing a degree of previous molding of the skin material by minimizing the surplus of the skin material in the mold by reducing the amount of opening of the mold (mold interval) before the injection and filling-up of the resin melt is performed without clamping the peripheral edge of the skin material by a skin material fixing frame or the like.

What is claimed is:

1. A method for producing a laminate article by fusion-bonding integrally a skin material to a core material using a horizontal mold clamping type injection molding machine, characterized in that said method comprises the steps of:

setting up a skin material by inserting it at a predetermined position in a cavity of a mold while keeping the mold open;

closing the mold to a predetermined mold clamping position thereafter;

injecting a resin melt for a core material into a space formed by the mold and the skin material so as to fill the space with the resin melt for a core material with the volume of the space formed by the mold and skin being larger than the volume of the resin melt injected;

opening said movable mold in accordance with the progress of injection to a predetermined position after a desired period of time passes from the start of the injection; and closing the mold after the completion of the injecting operation wherein said method can be completed without damage to the skin material of the thus molded article at the vicinity of a gate portion of the mold.

2. A method for producing a laminate article according to claim 1, characterized in that after the skin material is set up in the cavity of the mold, said mold is clamped by moving said movable mold to such a position that the mold interval between both the movable mold and the fixed mold is in the range of 2–25 mm.

3. A method for producing a laminated article according to claim 1, comprising the steps of:

completing mold application by clamping the mold again after the completion of the injection of the resin melt;

forming a gap between the skin material and said movable mold so as to form an air insulation layer by retracting said movable mold at a preset timing; and heating the skin material to a temperature equal to or higher than a glass transition temperature of a resin for skin material by a sensible heat of the resin melt for a core material, and;

holding the resultant skin material for a period of predetermined time.

* * * * *